United States Patent [19]

Lebby et al.

[11] Patent Number: 5,218,465
[45] Date of Patent: Jun. 8, 1993

[54] INTELLIGENT INTERCONNECTS FOR BROADBAND OPTICAL NETWORKING

[75] Inventors: Michael S. Lebby, Chandler; Davis H. Hartman, Phoenix, both of Ariz.

[73] Assignee: Motorola, Inc., Schaumburg, Ill.

[21] Appl. No.: 753,559

[22] Filed: Sep. 3, 1991

[51] Int. Cl.[5] .................... H04B 10/08; H04B 10/12
[52] U.S. Cl. ................................. 359/110; 359/173; 370/43; 340/825.01
[58] Field of Search ............... 359/110, 113, 152, 154, 359/173, 179, 181, 188, 195; 370/43, 99; 340/825.01

[56] References Cited

U.S. PATENT DOCUMENTS

| | | | |
|---|---|---|---|
| 4,306,313 | 12/1981 | Baldwin | 359/110 |
| 4,482,980 | 11/1984 | Korowitz et al. | 359/110 |
| 5,069,521 | 12/1991 | Hardwick | 359/110 |
| 5,075,792 | 12/1991 | Brown et al. | 359/152 |

FOREIGN PATENT DOCUMENTS 2131248  6/1984  United Kingdom ............... 359/110

*Primary Examiner*—Edward L. Coles, Sr.
*Assistant Examiner*—Kinfe-Michael Negash
*Attorney, Agent, or Firm*—Eugene A. Parsons

[57] ABSTRACT

An optical link having a terminal at each end, each terminal including formatting circuitry controllable to format transmitted data in a variety of configurations and to rectify formatting errors and failure detectors for detecting the failure of an optical path and switching to a properly operating redundant path.

3 Claims, 1 Drawing Sheet

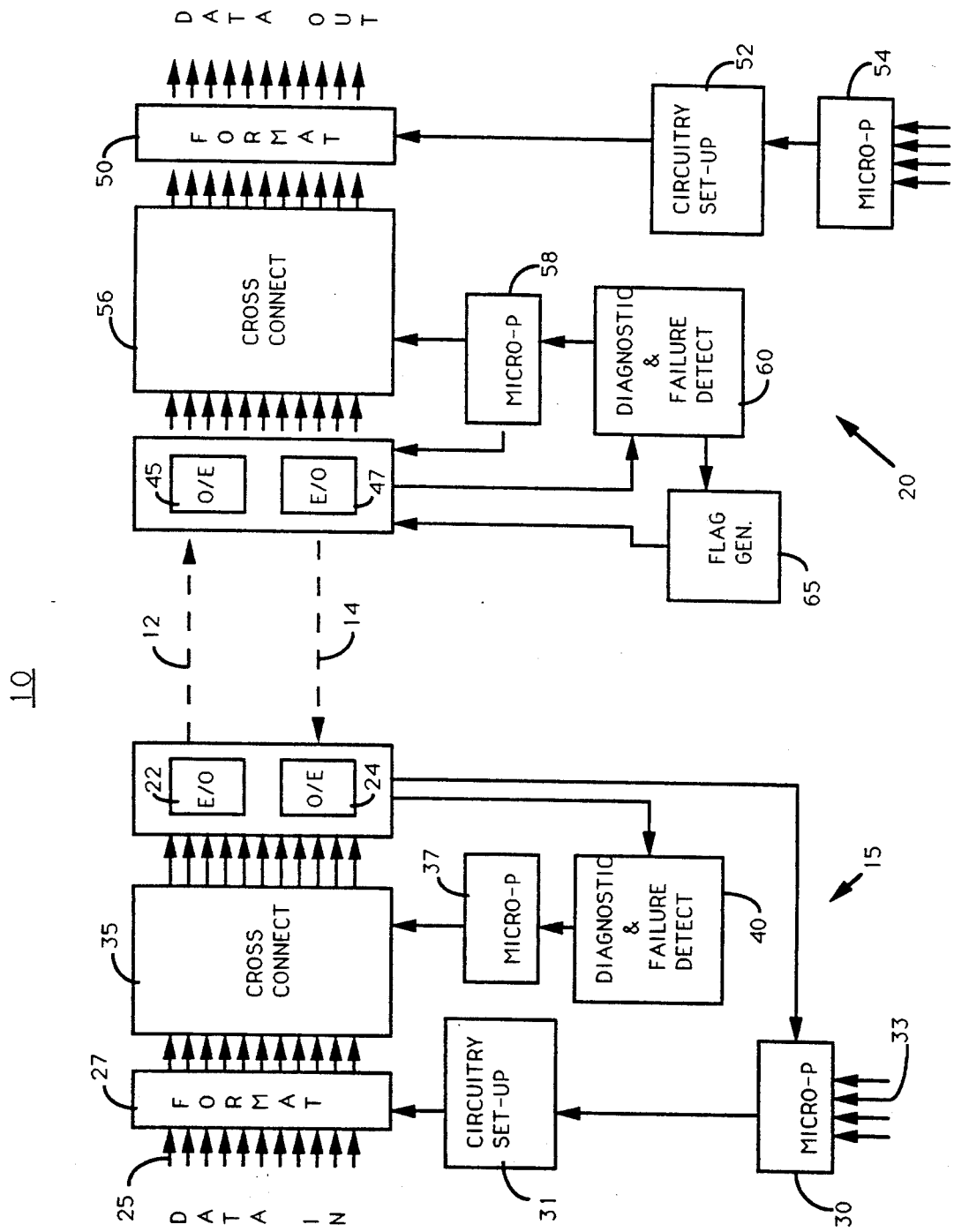

INTELLIGENT INTERCONNECTS FOR BROADBAND OPTICAL NETWORKING

The present invention pertains to interconnects for transmitting data and more specifically to intelligent interconnects utilizing optical links.

BACKGROUND OF THE INVENTION

Optical links, utilizing optical fibers and other light conducting materials, are well known in the art. In general, optical links are noted for the fact that they are capable of transmitting very high data rates (because of the high frequency operation) with very little interference and small amounts of power. Therefore, in theory optical links can be made smaller, which increases the density, and can carry more data, faster.

A problem arises, however, because control and other housekeeping signals, which are relatively slow, must be periodically transmitted. These signals slow the operation of the entire optical link to a point that is only slightly faster than normal electrical transmissions.

Further, transducers, which are used to convert electrical to optical energy and optical to electrical energy are the weakest point in the optical link. Clearly, the failure of a transducer during data transmission, which is extremely difficult to detect in the prior art optical links, renders the entire transmission useless.

SUMMARY OF THE INVENTION

The above problems and others are substantially solved in the present intelligent interconnects including: an optical channel having a plurality of optical paths extending between first and second termination points; a transmitting, data processing terminal at the first termination point including electrical to optical transducers having optical signal output terminals coupled to the optical paths and electrical signal input terminals, controllable data formatting circuitry having data input terminals for receiving raw data to be formatted for transmitting by way of the optical channel, a control input terminal for receiving a control signal designating a selected data format and output terminals coupled to the electrical signal input terminals of the electrical to optical transducers for providing selectively formatted data thereto, a receiving, data processing terminal at the second termination point including optical to electrical transducers having optical signal input terminals coupled to the optical paths and electrical signal output terminals, and controllable data formatting circuitry having data input terminals coupled to the electrical signal output terminals of the optical to electrical transducers for receiving formatted data from the optical channel, a control input terminal for receiving a control signal designating the selected data format and output terminals for providing raw data.

The above problems and others are substantially solved in the present intelligent interconnects including: an optical channel having a plurality of optical paths extending between first and second termination points; a transmitting, data processing terminal at the first termination point including electrical to optical transducers having optical signal output terminals coupled to the plurality of optical paths and electrical signal input terminals, controllable connecting circuitry having a control input terminal, data input terminals and output terminals coupled to selected electrical signal input terminals of the electrical to optical transducers, and control apparatus coupled to the controllable connecting circuitry for supplying a control signal to the control input terminal of the controllable connecting circuitry, the selected electrical signal input terminals being selected by the control signal; and a receiving, data processing terminal at the second termination point including optical to electrical transducers having optical signal input terminals coupled to the optical paths and electrical signal output terminals, controllable connecting circuitry having a control input terminal, data output terminals and input terminals coupled to selected electrical signal output terminals of the optical to electrical transducers, and control apparatus coupled to the controllable connecting circuitry for supplying a control signal to the control input terminal of the controllable connecting circuitry, the selected electrical signal input terminals being selected by the control signal.

The above problems and others are further substantially solved in the present method of transmitting data by means of an intelligent interconnect including a plurality of optical paths and a plurality of terminals including the steps of transmitting a predetermined data format between first and second terminals, formatting raw data to be transmitted in accordance with the predetermined format, applying the formatted data to the plurality of optical paths at the first terminal, and receiving the formatted data from the plurality of optical paths at the second terminal and converting the formatted data to raw data.

The above problems and others are further substantially solved in the present method of transmitting data by means of an intelligent interconnect including a plurality of optical paths and a plurality of terminals including the steps of transmitting data through selected optical paths of the plurality of optical paths between first and second terminals, monitoring each of the selected optical paths for fault-free operation at one of the terminals, and switching to a predetermined redundant one of the plurality of optical paths upon detecting a fault in one of the selected optical paths.

BRIEF DESCRIPTION OF THE DRAWINGS

The single figure is a simplified block diagram of an intelligent interconnect for broadband optical networking embodying the present invention.

DESCRIPTION OF THE PREFERRED EMBODIMENT

Referring to the single figure, an intelligent interconnect 10 is disclosed. Intelligent interconnect 10 includes an optical channel 12 extending between a plurality of remote termination points, in this specific embodiment two. Optical channel 12 includes a plurality of optical paths, which may be defined by optical fibers, multipath optical block material, or any similar material, or may be free space.

Intelligent interconnect 10 further includes an operation monitoring channel 14, which is an optical channel in this embodiment but may be electrical, if desired. Depending upon the length of intelligent interconnect 10, operation monitoring channel 14 may be, for example, an RF link, optical signals transmitted in free space, optical fibers, or hard wired. Operation monitoring channel 14 has termination points at the same places as optical channel 12 and, for this description, will be considered as a common unit.

A transmitting, data processing terminal 15 and a receiving, data processing terminal 20 are located at spaced apart termination points in optical channel 12. Terminal 15 includes electrical to optical transducers 22 coupled to optical channel 12 so as to convert electrical signals supplied thereto to optical signals which are then transmitted through optical channel 12 in a known manner. Terminal 15 further includes one or more optical to electrical transducers 24 which receive optical control signals from operation monitoring channel 14 and convert them to electrical control signals for operation of terminal 15.

Raw data to be transmitted is supplied to a data input terminal 25. It will of course be understood that while the raw data is supplied on parallel input lines in the present embodiment, for speed and convenience, that it could be supplied in series on a single input line. Data input terminal 25 is connected to the data input of a formatting circuit 27. Formatting circuitry 27 is controlled by a microprocessor 30 through a circuitry set-up circuit 31. Microprocessor 30 is programmed to react to control signals from operation monitoring channel 14, by way of transducers 24, or to formatting commands entered by way of input terminal 33.

Formatting circuitry 27 includes any convenient logic or phase converting circuits that are required to format incoming raw data into any selected or predetermined format, including but not limited to NRZ, RZ, TRISTATE, DELTAMOD MANCHESTER, etc. It should be understood that the incoming raw data may, in fact, have its own code and any code selected for transmission of the data on optical channel 12 must be selected so as not to interfere with original formatting of the raw data. Further, the specific formatting selected depends upon the number of optical paths available, simplicity, efficiency, ease of detecting errors and any specific applications, such as secrecy. As a specific example, four different formats may be selected, including transmitting the raw data as received, and the formatting is represented by a two bit code on input 33. Upon receiving the two bit code, microprocessor 30 sends control signals to circuitry set-up circuit 31 which in turn controls circuits within formatting circuitry 27 that are required to format incoming data in accordance with the selected format.

Microprocessor 30 also receives control signals from transducers 22 and 24, which are used for forward error correction coding of the formatted data signals. This particular connection may be used for retransmit coding, instead of or in addition to the error correction coding.

Cross connect apparatus 35 has data inputs connected to the data outputs of formatting circuitry 27 and data outputs connected to the various optical paths in optical channel 12. Optical channel 12 includes a plurality of selected or predetermined optical paths that are normally used for transmission of data and one or more redundant optical paths which are used in the event that one or more of the selected optical paths fails. Cross connect apparatus 35 is controllable to switch any one of the data input lines from the normal selected optical path to a redundant path. While in this specific embodiment cross connect apparatus 35 is simply a group of electrical switches controllable to alter the electrical paths of the electrical data signals, it will be understood by those skilled in the art that the switching might actually be accomplished in the optical circuitry after the electrical data signals have been converted to optical data signals by transducers 22. In the instance of switching optical data signals, cross connect apparatus 35 and transducers 22 are formed as a single unit or have the illustrated positions reversed.

A microprocessor 37 is connected to a control input of cross connect apparatus 35 and is programmed to control cross connect apparatus 35 to normally connect input data lines to selected optical paths. Microprocessor 37 receives failure detection signals from a diagnostic and failure detect circuit 40. Circuit 40 is in turn connected to transducers 22 so that it detects a failure in any of the optical paths and sends a signal denoting that failure to microprocessor 37. Circuit 40 may also/alternately be connected to transducers 24 so as to receive control signals (flags) from operation monitoring channel 14. In some systems it is desirable to include a separate diagnostic and failure detect circuit 40 in each transmitting and/or receiving terminal while in other applications it may be desirable to only include diagnostic and failure detect circuits in selected master terminals or at the receiving terminal. In applications where only one diagnostic and failure detect circuit is utilized, control signals are sent directly to microprocessor 37 from transducers 24.

When an optical path failure is detected by diagnostic and failure detect circuit 40, or a control signal is received from transducers 24, microprocessor 37 determines which optical path has failed (this determination is intuitive in the detection or control signal) and switches the data signals to a predetermined alternate or redundant optical path. In some embodiments, for example, each optical path in optical channel 12 has a redundant path which is automatically switched in when a failure in the original optical path is detected. In embodiments requiring less redundance, a small number of redundant optical paths are supplied and they are switched in, in a predetermined order, as failures in the original optical paths occur.

Diagnostic and failure detect circuit 40 may be as complicated as is required for each application and in the present embodiment includes simple logic circuits that monitor the data flowing in each optical path, and especially the operation of each transducer 22. A determination that one of transducers 22 is inoperative, for example, results in a signal being sent to microprocessor 37 and a redundant path being selected. A warning signal is then sent to a monitor (not shown) and the unit is repaired as quickly as possible. Diagnostic indications of problems are, for example, when a non-allowed sequence for the signal format being used is received.

Receiving, data processing terminal 20 includes the same components as transmitting, data processing terminal 15 with a few exceptions. Terminal 20 includes optical to electrical transducers 45 connected to optical channel 12 and electrical to optical transducers 47 connected to operation monitoring channel 14. Terminal 20 further includes formatting circuitry 50 with circuitry set-up circuit 52 and microprocessor 54 and cross connect circuitry with microprocessor 58 and diagnostic and failure detect circuit 60, all functioning as described in conjunction with terminal 15. One difference is that format circuit 50, in the present embodiment, reformats the received data into the original raw state so that the entire optical link is data transparent. It will of course be understood that format circuit 50 may utilize a code which is different than the code utilized by format circuit 27 to translate the received data into a different format, if desired. Another difference is that the connection from transducers 45, 47 to microprocessor 54 in not included since this is included in terminal 15 to provide a correction for formatting errors.

Also, terminal 20 includes a flag generating circuit 65 connected to diagnostic and failure detect circuit 60 and to operation monitoring channel 14 through transducers 47. Flag generating circuit 65 receives an indication of an optical path failure from diagnostic and failure detect circuit 60 and generates a flag which is sent to terminal 15 so that the failed optical path is switched at transmitting and receiving data processing terminals 15 and 20.

The inputs to microprocessors 30 and 54 at the transmitter and receiver terminals 15 and 20, respectively, can be, for example, driven from a work station or other computerized system (not shown). In instances where an external computer is utilized to supply inputs to microprocessors 30 and 54, soft errors that occur in the data formatting and/or transmission can be controlled by this external computer by altering the formatting as the errors are detected.

It will of course be understood that terminals 15 and 20 can be permanent or portable units and, for use in communication systems, may be incorporated as a pair at each termination point so that an operator can transmit and receive. Further, while individual components are disclosed in the present embodiment, it will be understood that portions, or all, of each terminal 15 and 20 can be incorporated into a single IC or MC module. Also, if a transmitter and receiver terminal are included as a pair at a single termination point, some of the components can serve a dual purpose.

Thus, a new and improved intelligent interconnect for broadband optical networking is disclosed which monitors each of the optical paths in an optical channel and automatically switches to a redundant path whenever a failure is detected. This feature provides survivability to hard errors and greatly enhances the hardware lifetime, as well as the continuous operation. Also, certain soft errors are monitored, detected and corrected, which further enhances the operation of the system.

Because control and other relatively slow housekeeping signals are transmitted by a separate channel, data transmission by means of the optical channel is optimized and the full value and advantages of an optical link are realized.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. An intelligent interconnect comprising:
    an optical channel having a plurality of optical paths and a plurality of redundant optical paths extending between first and second termination points;
    an operation monitoring channel extending between the first and second termination points;
    a transmitting, data processing terminal at the first termination point including
        electrical to optical transducers having optical signal output terminals coupled to the optical paths and electrical signal input terminals,
        data formatting circuitry having data input terminals for receiving data to be formatted for transmitting by way of the optical channel, a control input terminal for receiving a control signal designating a specific data format and output terminals for providing selectively formatted data, the data formatting circuitry being connected to receive a control signal on the control input terminal from one of the operation monitoring channel and an external source and including a microprocessor and logic circuitry, the microprocessor being programmed to control the logic circuitry to format data supplied to the data input terminal in accordance with the control signal supplied to the control input terminal,
        controllable connecting circuitry having a control input terminal, data input terminals coupled to the output terminals of the data formatting circuitry and output terminals coupled to the electrical signal input terminals of the electrical to optical transducers, the controllable connecting circuitry being controllable to reroute data supplied to the data input terminals onto redundant optical paths in response to a control signal supplied thereto, and
        control apparatus, including a micropocessor, coupled to the operation monitoring channel and the controllable connecting circuitry for supplying a control signal to the control input terminal of the controllable connecting circuitry in response to receiving an operation change signal from the operation monitoring channel, the control apparatus including diagnostic and failure detecting circuitry having input terminals connected to the electrical to optical and optical to electrical transducers for detecting failures in individual optical paths and an output terminal connected to provide control signals to the control input terminal of the controllable connecting circuitry; and
    a receiving, data processing terminal at the second termination point including
        optical to electrical transducers having optical signal input terminals coupled to the optical paths and electrical signal output terminals,
        data formatting circuitry having data input terminals for receiving formatted data from the optical channel, a control input terminal for receiving a control signal designating a specific data format and output terminals for providing selectively formatted data, the data formatting circuitry being connected to receive a control signal on the control input terminal from an external source and including a microprocessor and logic circuitry, the microprocessor being programmed to control the logic circuitry to format data supplied to the data input terminal in accordance with the control signal supplied to the control input terminal,
        controllable connecting circuitry having a control input terminal, data output terminals coupled to the input terminals of the data formatting circuitry and input terminals coupled to the electrical signal output terminals of the optical to electrical transducers, the controllable connecting circuitry being controllable to reroute data supplied to the data input terminals onto redundant optical paths in response to a control signal supplied thereto, and
        control apparatus, including a microprocessor with an external control input, coupled to the operation monitoring channel and the controllable connecting circuitry for supplying a control signal to the control input terminal of the controllable connecting circuitry in response to receiving an operation change signal from the operation monitoring channel, the control apparatus including diagnostic and failure detecting circuitry having input terminals connected to the electrical to optical and optical to electrical transducers for detecting failures in individual optical paths and an output terminal connected to provide control signals to the control input terminal of the controllable connecting circuitry.

2. An intelligent interconnect as claimed in claim 11 wherein the operation monitoring channel includes an electrical channel.

3. An intelligent interconnect as claimed in claim 2 wherein the electrical channel includes a high frequency transmission link.

* * * * *